United States Patent [19]
Smith

[11] Patent Number: 4,685,555
[45] Date of Patent: Aug. 11, 1987

[54] CONVEYOR HOOK LINK WITH PADDLE ASSEMBLY AND COUPLING METHOD

[75] Inventor: Robert W. Smith, Kaukauna, Wis.

[73] Assignee: Badger Northland, Inc., Kaukauna, Wis.

[21] Appl. No.: 797,998

[22] Filed: Nov. 14, 1985

[51] Int. Cl.⁴ ............................................. B65G 19/24
[52] U.S. Cl. ................................... 198/731; 198/733; 198/850; 59/85; 59/93
[58] Field of Search ......................... 59/85, 84, 90, 93; 198/731, 733, 850, 852, 853

[56] References Cited

U.S. PATENT DOCUMENTS

| | | |
|---|---|---|
| 181,082 | 8/1876 | Levalley . |
| 993,248 | 5/1911 | Hayward . |
| 1,020,863 | 3/1912 | Weichseldorfer ............... 198/731 |
| 2,646,158 | 7/1953 | Vodoz ............................. 198/733 |
| 2,785,578 | 3/1957 | Nold . |
| 2,792,937 | 5/1957 | Searles ........................... 198/731 |
| 2,853,887 | 9/1958 | Johnson . |
| 2,865,493 | 12/1958 | St. Pierre ...................... 198/733 |
| 3,331,489 | 7/1967 | Mattson ......................... 198/850 |
| 3,374,879 | 3/1968 | Vincent ......................... 198/731 |
| 4,011,715 | 3/1977 | Graetz . |
| 4,113,084 | 9/1978 | Temme ........................... 198/731 |

FOREIGN PATENT DOCUMENTS

| 2105960 | 8/1972 | Fed. Rep. of Germany ...... 198/731 |
|---|---|---|
| 2102207 | 8/1972 | Fed. Rep. of Germany ...... 198/731 |

OTHER PUBLICATIONS

Patz sales brochure, pp. 3–5, 8–11.

Primary Examiner—Robert L. Spruill
Assistant Examiner—David B. Jones
Attorney, Agent, or Firm—King & Schickli

[57] ABSTRACT

A hook line includes a hook portion and a link portion contained in two different planes substantially perpendicular to one another. A projection tip is provided on a distal end of the hook portion to provide secure locking action between adjacent hook links; the normal clearance between the tip and the connected link portion being insufficient to allow coupling/uncoupling action. A tip receiving groove extends substantially laterally across the elongated ring forming the link portion. The ring defines a longitudinal slot for receipt of said hook portion. The groove of one hook link receives the projection tip of an adjacent hook link to allow coupling/uncoupling action. In the preferred embodiment, the groove extends along an arc between a transverse midline of said longitudinal slot and an end of said longitudinal slot opposite said hook portion. The groove and tip structure substantially eliminates uncoupling during normal conveyor operation even when subjected to incidental slackening. The link portion may additionally be provided with a paddle mounting bracket for mounting a reversible/replaceable conveyor paddle and wear shoe.

19 Claims, 8 Drawing Figures

CONVEYOR HOOK LINK WITH PADDLE ASSEMBLY AND COUPLING METHOD

TECHNICAL FIELD

The present invention relates generally to conveyors and, more particularly, to a hook link and paddle assembly for use in a barn cleaner, or the like. A method of coupling the hook links is also provided.

BACKGROUND OF THE INVENTION

Barn or gutter cleaners are well known in the art. A barn cleaner of the type to which the present invention applies includes a gutter system that runs through the barn area as, for example, along animal stalls. A scraper chain conveyor is received in and runs through the gutter system. Animal refuse, straw and other debris are scraped and washed from the stalls and deposited conveniently into the adjacent gutter. The scraper chain conveyor is activated periodically and the flights or paddles of the scraper chain convey the refuse and debris through the gutter system and out of the barn up along an inclined chute for delivery into a holding bin, manure pit, compost pile, or the like.

Barn cleaner chains have previously included coupled hook links. Each hook link includes a hook portion and a link portion. The hook portion of one hook link is extended through the longitudinal slot of the link portion of an adjacent hook link. The closed end of the hook is then brought into engagement with the link portion forming the end of the slot to complete the assembly. Multiple hook links combined in this fashion form the chain.

One problem with chains formed from hook links is a tendency to uncouple, particularly during slackening and snaking on the return run down the inclined chute back to the barn. Often, before such an uncoupling is discovered, an entire chain is disassembled and has even unloaded one or several hook links and paddle assemblies from the conveyor into the spreader or manure pit. It should be appreciated that the hook links and paddle assemblies are difficult, if not impossible to retrieve under these circumstances. Additionally, it is very time consuming to have to reconnect each of the hook links and again install the chain in the gutter for operation.

Several attempts have been made in the art to address and solve this uncoupling problem. In U.S. Pat. No. 2,853,887 to Johnson, each hook link is provided with a removable lock pin that is driven into a seated position between the end of the hook and the hook link body to close the throat of the hook and retain the hook links in the coupled state. When properly seated, the pin is effective in theory to prevent the uncoupling of adjacent hook links. It, however, should be appreciated that hook links and paddle assemblies constructed in this manner are, due to being subject to rough treatment during service, prone to being accidentally uncoupled due to the lock pin being knocked loose and lost. Further, removal of the lock pin each time a hook link is to be disconnected can be particularly tedious and time consuming. On the other hand, under some severe service conditions the lock pins can become rusted or frozen in position and made difficult, and sometimes impossible, to remove. For these and other reasons, hook links with separate locking pins have achieved only limited success in the market place.

Another approach to solving the uncoupling problem is found in U.S. Pat. No. 2,785,578 to Nold. Nold discloses a conveyor chain formed from a series of alternating substantially oval links and double hook links. Each oval link includes a portion of reduced cross-sectional area that slips through the throat of the hook for connection to the double hook link and formation of the chain. By eliminating the separate lock pin seated in the throat of the hook the Nold chain does not suffer the same disadvantages but is simply more prone to being accidentally uncoupled.

Specifically, the Nold chain is prone to uncoupling during incidental slackening of the chain that often takes place during conveyor operation, especially on the return run. Since each oval link receives a hook of a double hook link at each end, the reduced cross-sectional portion of the link (that allows coupling and uncoupling) is positioned adjacent one of the hooks. As the chain slackens, the hook, adjacent the reduced cross-sectional portion, can easily slide along the link until the throat engages the reduced portion. At this point simple movement of the hook in a straight line, such as may be caused by gravity or the taking up of the slack on the chain, causes the hook of the double hook link to uncouple from the oval link.

In addition to the shortcomings of the hook link design, the prior art barn cleaners have not been designed so as to allow replacement of a paddle and/or wear shoe independently of the hook link. Furthermore, for still further economy with respect to replacement parts, it would be desirable to have the paddle and wear shoe interchangeable for clockwise (CW) and counterclockwise (CCW) conveyor operation.

From the above it is clear that a need exists for an improved hook link and combined hook link with paddle assembly as, for example, used on barn or gutter cleaners.

SUMMARY OF THE INVENTION

Accordingly, it is a primary object of the present invention to provide an improved hook link for a conveyor hook chain overcoming the above-described limitations and disadvantages of the prior art.

Another object of the present invention is to provide a hook link of simple construction that may be easily coupled together with adjacent hook links to form a conveyor hook chain while substantially eliminating uncoupling during normal conveyor operation even when subjected to incidental slackening.

A further object of the present invention is to provide a hook link with paddle assemblies for a conveyor hook chain that may be easily uncoupled for removal and/or replacement of individual parts during maintenance, but that effectively resists uncoupling during service.

Still another object of the present invention is to provide a hook link with paddle assemblies for a conveyor hook chain wherein the paddles and wear shoes are interchangeable for opposite (CW and CCW) movement in the gutter system.

Still another object of the invention is to provide a simple, efficient and effective apparatus and method of coupling adjacent hook links to form a conveyor hook chain, and of component replacement.

A further object of the present invention is to provide a conveyor hook chain for a barn or gutter cleaner with improved hook links and paddle assemblies including a replaceable/reversible conveyor paddle and/or wear shoe.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved hook link for a conveyor hook chain, such as used in barn or gutter cleaners, is provided. The hook link includes a hook or hook-shaped portion having a projection tip and a link portion A tip receiving groove is provided in the link portion. The tip receiving groove allows substantially free passage of the projection tip across the link portion to allow for repair and maintenance operations. As desired, the normal clearance between the tip and the connected link portion in a completed conveyor hook chain is insufficient to allow accidental coupling/uncoupling action. Thus, the hook links of the present invention substantially eliminate uncoupling during normal conveyor operation, even when subjected to severe operating conditions and incidental slackening as, for example, typically occurs along the return run of a conveyor.

The hook portion and the link portion are contained in two separate planes substantially perpendicular to one another. The projection tip on the distal end of the hook portion extends toward the plane containing the link portion so as to limit the size of the opening or throat of the hook.

Preferably, the link portion includes an elongated ring forming a substantially longitudinal slot. The tip receiving groove extends substantially laterally across this ring along an arc drawn to encompass the hook portion.

The groove is formed in the ring of the link portion between a transverse midline of the longitudinal slot and the end of the longitudinal slot opposite the hook portion. During slackening, the projection tip contacts the thick section of the end of the ring portion and not the groove, thus preventing disassembly. Accidental and undesired uncoupling during conveyor operation is not likely since (1) the hook portion would have to move all the way forward along the slot while turned at a 45° angle; (2) the tip would have to somehow align with the groove; (3) the hook portion then would have to rotate in the opposite direction through 45°; and (4) finally the hook portion would have to separate from the slot. Such a sequence of events is very unlikely, if not impossible, even during chain slackening and snaking periods as, for example, during the return run of the chain down the inclined chute.

In accordance with another aspect of the invention, the hook link is combined with a paddle assembly including an integral paddle mounting bracket. The bracket may be welded to the hook link and made with a substantially L-shaped cross section forming a carrier for a replaceable paddle or flight. The bracket and paddle are designed so that an end of the paddle abuts the side face of the hook link for alignment when mounted. Such a design advantageously allows the paddle to be removed and replaced easily.

A removeable and replaceable wear shoe may also be mounted to the paddle mounting bracket. Preferably, the wear shoe is mounted to the opposite face of the paddle mounting bracket from the paddle. The wear shoe may be a channel, that is substantially C-shaped, with a wide face that engages the bottom of the gutter. The wide face assures that direct, wear contact between the paddles and the gutter is substantially eliminated. The wear shoe serves as a support for the hook link chain above the floor of the gutter system, thus providing improved life expectancy.

A single releaseable fastener, such as a nut and bolt, may be used to secure the paddle and wear shoe to the mounting bracket. Advantageously, multiple mounting apertures are provided on the bracket, paddle and wear shoe for easy reversibility so that separate components need not be manufactured for clockwise and counterclockwise installations. This reduces inventory costs to both the manufacturer and dealers. Further, since the wear shoes and paddles are replaceable, customers need only replace those components as they wear while continuing to use the same hook link and bracket. This also results in lower maintenance costs to the consumer.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
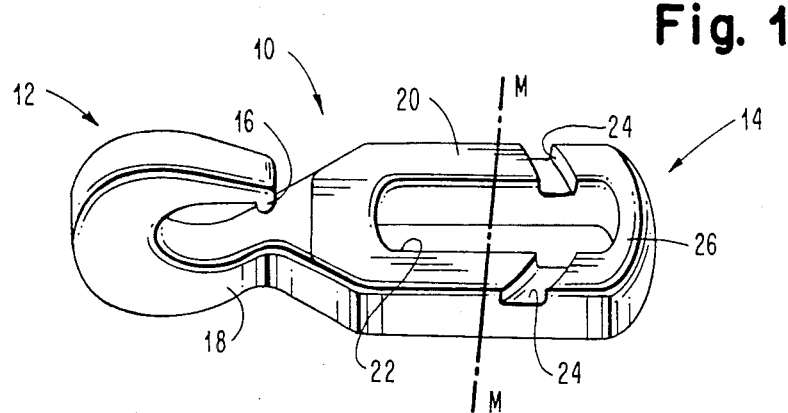
FIG. 1 is a perspective view of a hook link constructed in accordance with the teachings of the present invention.

Reference is now made to FIG. 1 showing an improved hook link 10 for utilization in a conveyor hook chain, such as found in a barn gutter cleaning system or the like. The hook link 10 includes a hook portion or hook-shaped 12 and a link portion 14. The hook and link portions 12, 14 are contained in two different planes substantially perpendicular to one another. A projection tip 16 is provided on the distal end of the hook portion. As should be appreciated the projection tip 16 extends toward the neck 18 of the hook portion so as to limit the width of the throat or opening of the hook 12.

The link portion 14 includes an elongated ring 20 forming a substantially longitudinal slot 22. A tip receiving groove 24 extends substantially laterally across the ring 20. The groove 24 is actually split into two sections in the ring 20 and extends along a portion of an arc that may be drawn to correspond to size of the hook portion 12. The groove 24 extends between a transverse midline M of the longitudinal slot 22 and the end 26 of the ring opposite the hook portion 12.

Figure 2A:
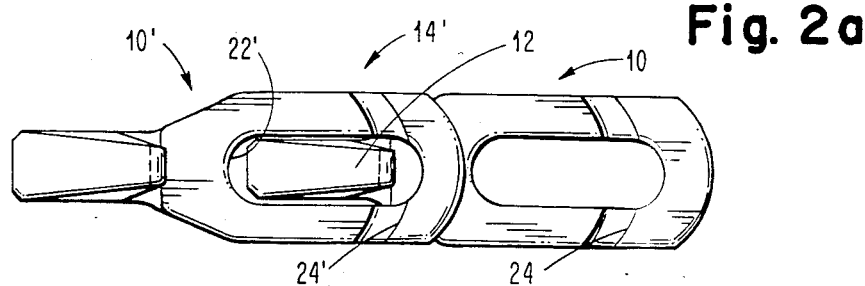
FIGS. 2a–2c are top plan views of two hook links being coupled together in accordance with the coupling method of the present invention.
Figure 2B:
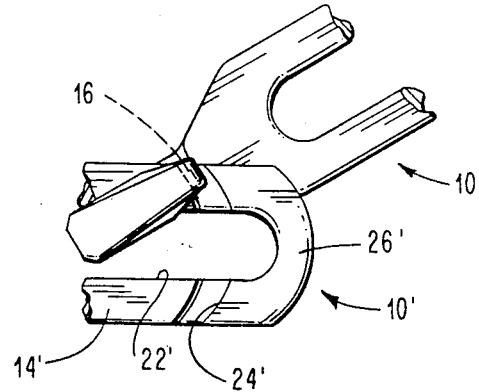

The hook projection tip 16 and radial tip receiving groove 24 allow easy coupling and uncoupling of the hook and link portions 12, 14 of adjacent hook links. As shown in FIG. 2a, the hook portion 12 of a first hook link 10 is passed into the longitudinal slot 22' defined in the link portion 14' of a second hook link 10'. The projection tip 16 of the first hook link 10 is aligned with one section of the split groove 24' in the ring 20'. The first hook link 10 is then rotated or pivoted sideways relative to the second hook link 10' approximately 45° while remaining in substantially parallel planes (see FIG. 2b) so as to pass the projection tip 16 completely through the groove 24' to a position outside the ring 14'.

Figure 2C:
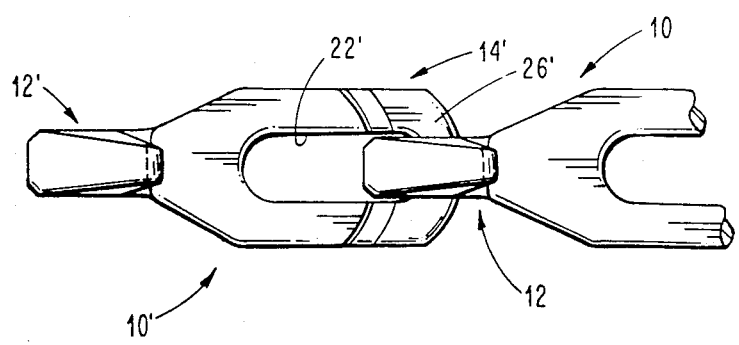

As shown in FIG. 2c, the method of coupling the hook links concludes with the step of sliding the hook portion 12 of the first hook link 10 toward the end of the longitudinal slot 22'. When this is done, it should be appreciated that the end 26' of the link portion 14' is securely received and retained in the hook portion 12. Specifically, the projection tip 16 extends across the opening or throat of the hook 12 a sufficient amount so as to prevent the passage of the ring end 26' through the hook throat. Thus, as the chain slackens, the projection tip 16 engages the ring end 26' and prevents uncoupling. It should be recognized, however, that the hook 12 has an opening of sufficient breadth to allow the coupled hook links to flex relative to one another for dependable sprocket action and smooth operation up and down the chutes, through the gutter and along the conveyor without binding.

Figure 4:
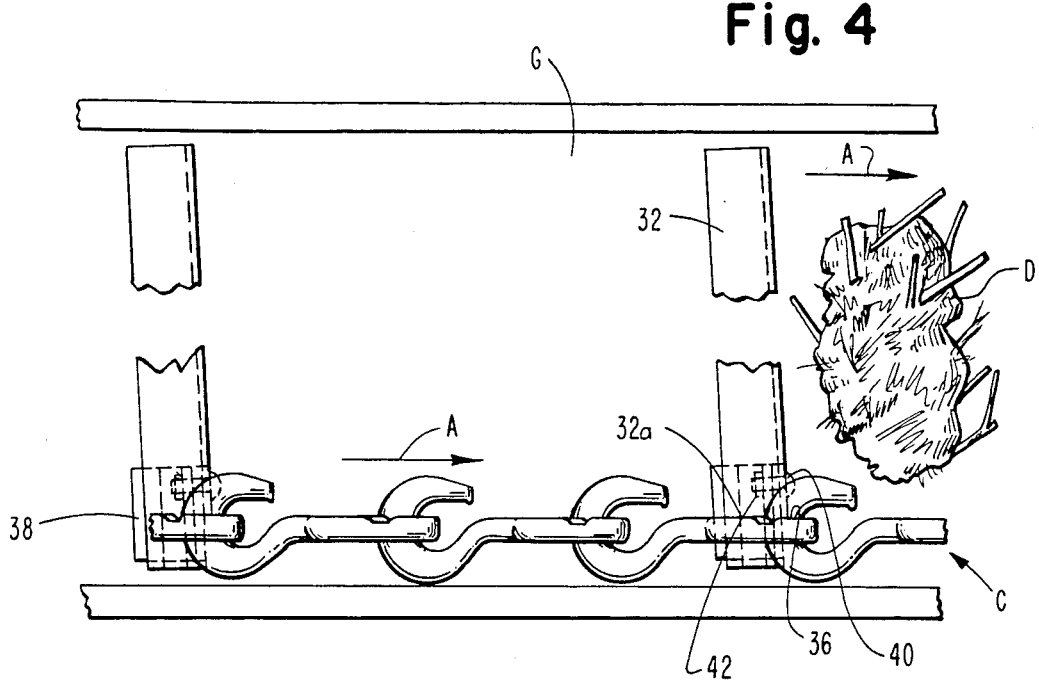
FIG. 4 is a top plan view of a section of a conveyor in a gutter cleaning system constructed so as to incorporate the concepts of the present invention.
Figure 3:
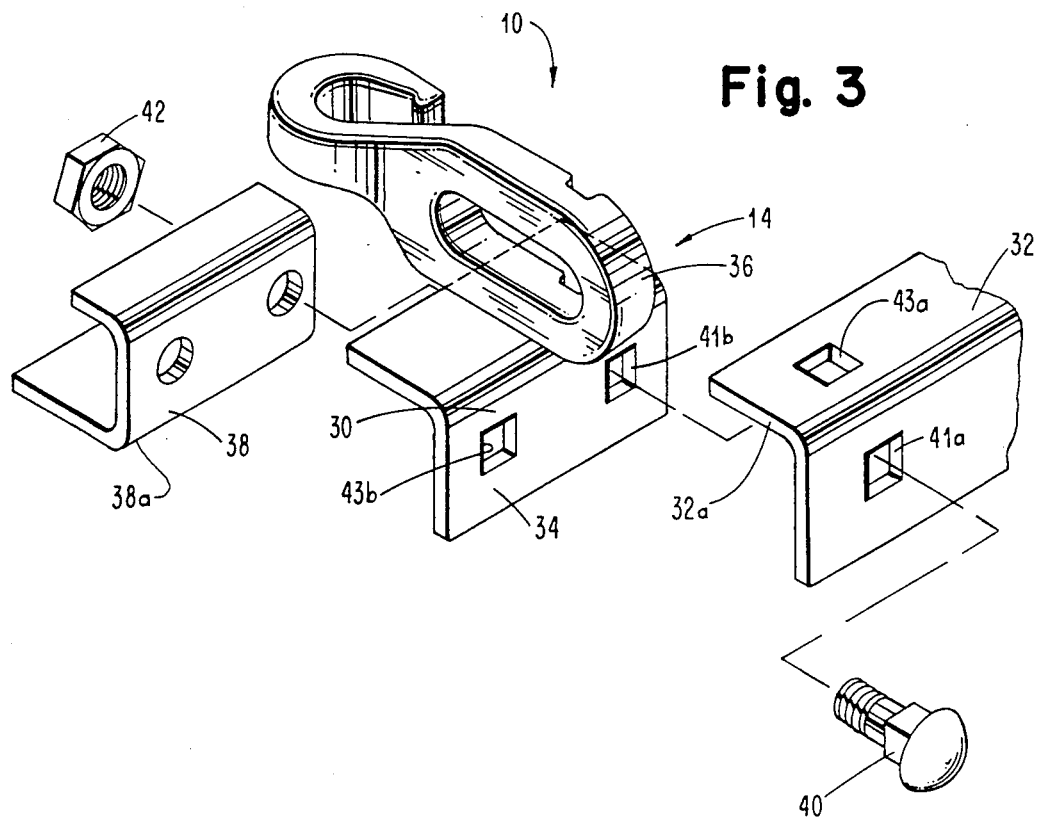
FIG. 3 is an exploded perspective view showing a hook link of the present invention with a paddle assembly including a mounting bracket, paddle (broken away) and wear shoe.
Figure 5:
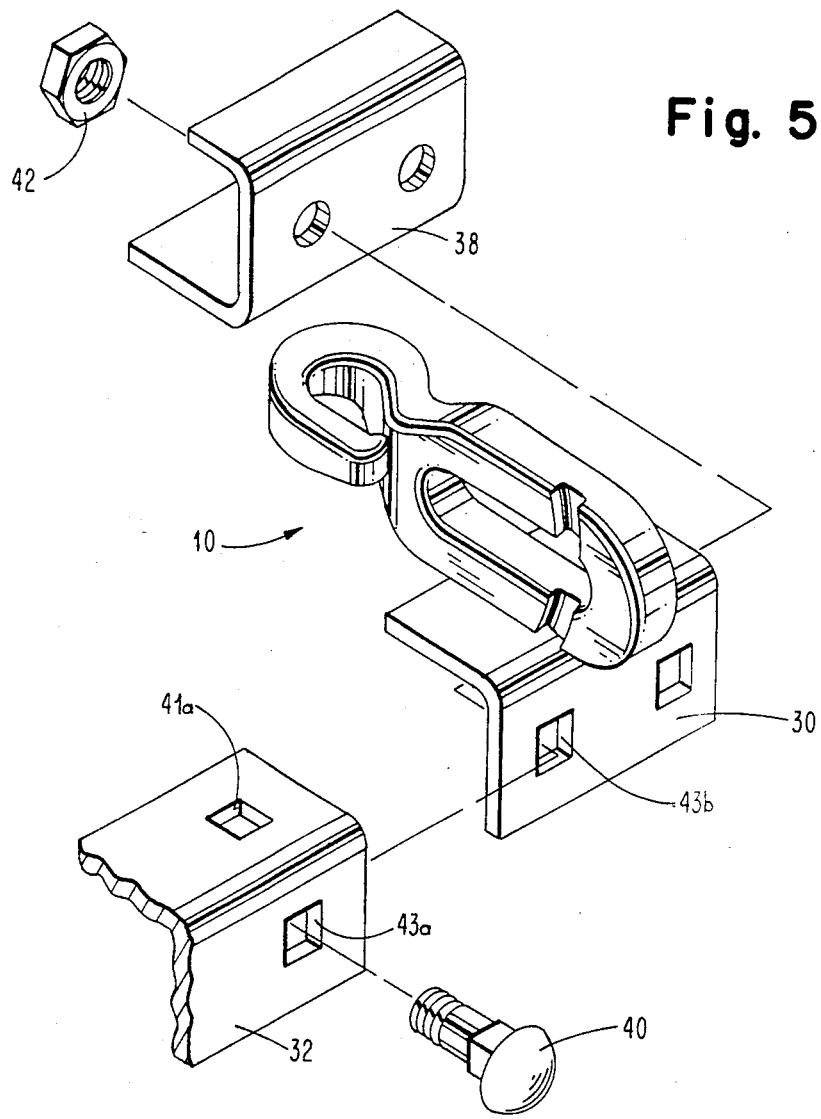
FIGS. 5 and 6 correspond to the showings in FIGS. 3 and 4, respectively, but with the conveyor set up for movement in the opposite direction.

When the hook link 10 of the present invention is used for a conveyor hook chain C, such as required in a barn gutter cleaning system as shown in FIG. 4, it is desirable to mount multiple paddle assemblies to the chain to scrape manure, straw and other debris D along the gutter G for transport to a spreader or manure pile at a remote location (not shown). In order to do this, a substantially L-shaped paddle mounting bracket 30 is welded to the bottom of the link portion 14, as shown in FIG. 3. A replaceable paddle 32 is carried on the face 34 of the mounting bracket 30. The paddle 32 faces in the direction of movement (note FIG. 4, action arrows A) within the gutter G (nominal clockwise [CW] in FIG. 4). When properly mounted to the mounting bracket 30, the end 32a of the paddle 32 abuts for alignment against the side face 36 of the ring 20.

A replaceable wear shoe 38 forms the last component of the paddle assembly, and is mounted to the opposite or rearwardly facing side or face of the mounting bracket 30. The wear shoe 38 is a channel that is substantially C-shaped, and provides an enlarged bottom face 38a upon which the weight of the chain C and paddles 32 rest during conveyor operation.

As shown, a fastener, in the form of a shoulder nut and bolt 40, 42, respectively, may be used to fasten the paddle 32 and wear shoe 38 to the paddle mounting bracket 30. When the nominal CW set up of FIG. 4 is utilized, the bolt 40 passes through square apertures 41a, 41b in the paddle and bracket, respectively. The mating shoulder on the bolt 40 (see FIG. 3) and the carrier face 34 of the bracket 30 assures that the paddle 32 is locked tightly and held parallel to the bottom of the gutter. The sliding action of the paddle 32 along the gutter is thus smooth, and any wear is uniform. The weight of the chain is positioned directly over the wear shoe with the enlarged skid face 38a receiving the majority of the wear of the paddle assembly, as desired. Repair and maintenance of the wear shoe and paddle is simplified, since the removal of a hook link and reassembly of the chain as with prior art devices is not required.

Figure 6:
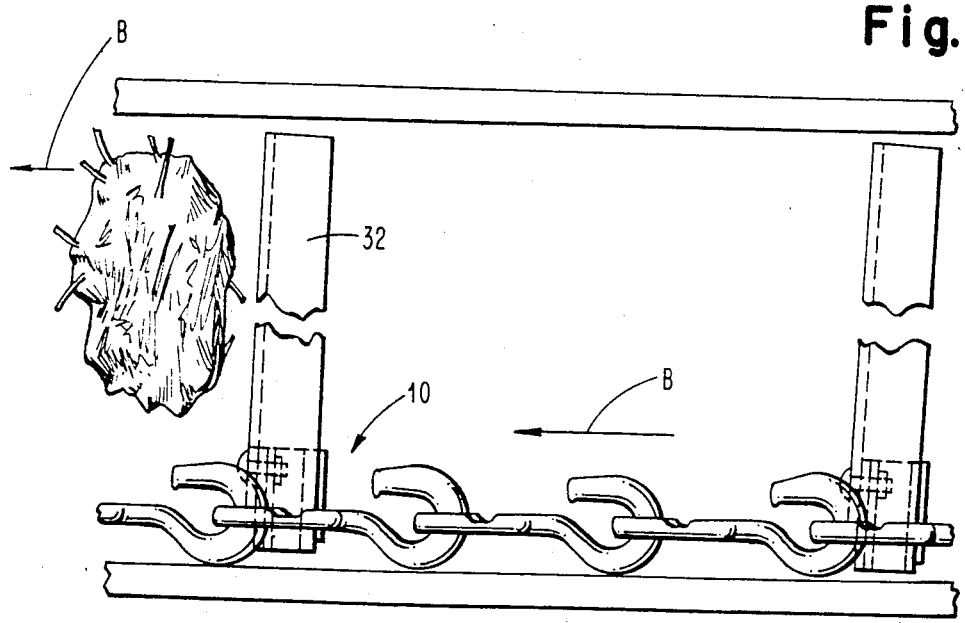

The provision of a separate set of square apertures 43a, 43b on the paddle 32 and on the bracket 30, respectively, (and separate mating apertures in wear shoe 38) allows easy reversal of the conveyor (note nominal CCW motion, arrow B, in FIG. 6). The apertures 41b, 43b are on opposite sides of the hook link 10 allowing the reversing action to be effected with the same hook link 10 being used. All that is required to convert to CCW is to first reverse the links during initial conveyor set-up (compare FIGS. 4 and 6). Next, each paddle 32 is simply reversed so that the top becomes the pusher face. The wear shoe 38 is placed behind each bracket. Thus, the parts are fully reversible and interchangeable providing substantial manufacturing and component stocking economy over the prior art arrangements.

In summary, numerous benefits have been described which result from employing the concepts of the invention. Together, the projection tip 16 and tip receiving groove 24 allow easy coupling/uncoupling action of the hook portion 12 and link portion 14 of adjacent hook links 10 during routine conveyor set up, as well as during maintenance operations. The arcuate shape and lateral positioning of the groove 24 along the link portion ring 20 serve to substantially eliminate uncoupling during normal conveyor operation. The normal clearance between the tip 16 and the connected link portion 14 at the end 26 is insufficient to allow coupling/uncoupling action, and the multiple moves necessary for tip/groove alignment; hook link pivoting and then separation is virtually impossible to attain with incidental slackening action along the return run of the conveyor. Advantageously, the paddle mounting bracket 30 allows the use of reversible/replaceable paddles 32 and wear shoes 38. Thus, manufacturers and dealers no longer need to stock separate inventories of paddles and wear shoes for clockwise and counterclockwise rotation in a conveyor. With the replaceable component concept, no longer is the consumer required to replace an entire one-piece unit. This, of course, results in lower maintenance costs to the consumer.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A hook link for a conveyor hook chain comprising:
   a hook-shaped portion including a projection tip adjacent distal end of said hook-shaped portion;
   a link portion substantially contained in a first plane, connected to said hook-shaped portion for receiving the hook-shaped portion of the adjacent hook link, means on said adjacent connected hook links to allow rotation with respect to one another in substantially the same plane, said projection tip extending toward said first plane, so that the normal clearance between said tip and the link portion of the adjacent connected hook link being insufficient to allow coupling/uncoupling action; and
   a tip receiving groove in the link portion for allowing substantially free passage of said projection tip across said link portion for coupling/uncoupling action whereby said tip and said groove allows easy coupling/uncoupling of said hook-shaped portion and link portion of adjacent hook links by rotating said adjacent hook links relative to one another in substantially parallel planes while substantially eliminating uncoupling during normal conveyor operation even when subjected to incidental slackening.

2. The hook link recited in claim 1, wherein said hook-shaped portion is substantially contained in a second plane, and said first and second planes are substantially perpendicular to one another.

3. The hook link recited in claim 2, wherein said projection tip is rounded.

4. The hook link recited in claim 1, wherein said link portion includes an elongated ring forming a substantially longitudinal slot and said tip receiving groove extends substantially laterally across the ring.

5. The hook link recited in claim 4, wherein said tip receiving groove extends along a portion of an arc extending around said hook-shaped portion.

6. The hook link recited in claim 4, wherein said groove is formed in between a transverse midline of said substantially longitudinal slot and an end of said link portion opposite said hook-shaped portion.

7. A hook link combined with a paddle assembly for a conveyor hook chain, comprising:
   a hook-shaped portion including a projection tip adjacent a distal end of said hook-shaped portion;
   a link portion substantially contained in a first plane, connected to said hook-shaped portion for receiving the hook-shaped portion of the adjacent hook link, means on said adjacent connected hook links to allow rotation with respect to one another in substantially the same plane, said projection tip extending toward said first plane, so that the normal clearance between said tip and the link portion of the adjacent connected hook link being insufficient to allow coupling/uncoupling action;
   a tip receiving groove in the link portion for allowing substantially free passage of said projection tip across said link portion for coupling/uncoupling action whereby said tip and said groove allows easy coupling/uncoupling of said hook-shaped portion and link portion of adjacent hook links by rotating said adjacent hook links relative to one another in substantially parallel planes while substantially eliminating uncoupling during normal conveyor operation even when subjected to incidental slackening; and
   a paddle mounting bracket connected to said link portion and a paddle carried on said bracket.

8. The hook link recited in claim 1, wherein said hook-shaped portion, link portion, projection tip and tip receiving groove are integrally formed.

9. The hook link with paddle assembly recited in claim 7, wherein said paddle mounting bracket is substantially L-shaped in cross-section.

10. The hook link with paddle assembly recited in claim 9, wherein said paddle is mounted to the face of said paddle mounting bracket.

11. The hook link with paddle assembly recited in claim 10, wherein an end of said paddle abuts a face of said link portion when said paddle is mounted to said paddle mounting bracket.

12. The hook link with paddle assembly recited in claim 7, wherein a wear shoe is mounted to said paddle mounting bracket.

13. The hook link with paddle assembly recited in claim 12, wherein said wear shoe is mounted to a face of said paddle mounting bracket opposite said paddle.

14. The hook link with paddle assembly recited in claim 12, wherein said wear shoe is substantially C-shaped.

15. The hook link with paddle assembly recited in claim 12, wherein a releaseable fastener is provided to fasten said paddle and said wear shoe to said paddle mounting bracket.

16. The hook link with paddle assembly recited in claim 7 wherein said bracket is provided with first and second apertures on opposite sides of said hook link, a fastener extending through one of said apertures to position said paddle and wear shoe for a selected conveyor motion.

17. The hook link with paddle assembly recited in claim 16 wherein said apertures on said bracket are aligned with like apertures on said paddle, a fastener extending through adjacent apertures, shoulder means on said fastener to mate with said apertures to lock said paddle in position with respect to said bracket.

18. The hook link with paddle assembly recited in claim 17 wherein is provided a wear shoe mounted to said paddle mounting bracket.

19. A method of coupling adjacent hook links of a conveyor hook chain together, comprising the steps of:
   passing a hook-shaped portion of a first hook link into a longitudinal slot defined by a link portion of a second hook link;
   aligning a projection tip of said hook-shaped portion of said first hook link with a laterally extending groove in said link portion of said second hook link;
   rotating said first hook link relative to said second hook link so as to pass said projection tip through said groove; and
   sliding said hook-shaped portion of said first hook link toward an end of said link portion of said second hook link so as to complete the coupling.

* * * * *